Sept. 2, 1930.  W. A. KLINE  1,774,892
INNER TUBE FOR PNEUMATIC TIRES
Filed Nov. 5, 1929  2 Sheets-Sheet 1

INVENTOR
Walter A. Kline.
BY
ATTORNEY

Sept. 2, 1930.   W. A. KLINE   1,774,892
INNER TUBE FOR PNEUMATIC TIRES
Filed Nov. 5, 1929   2 Sheets-Sheet 2
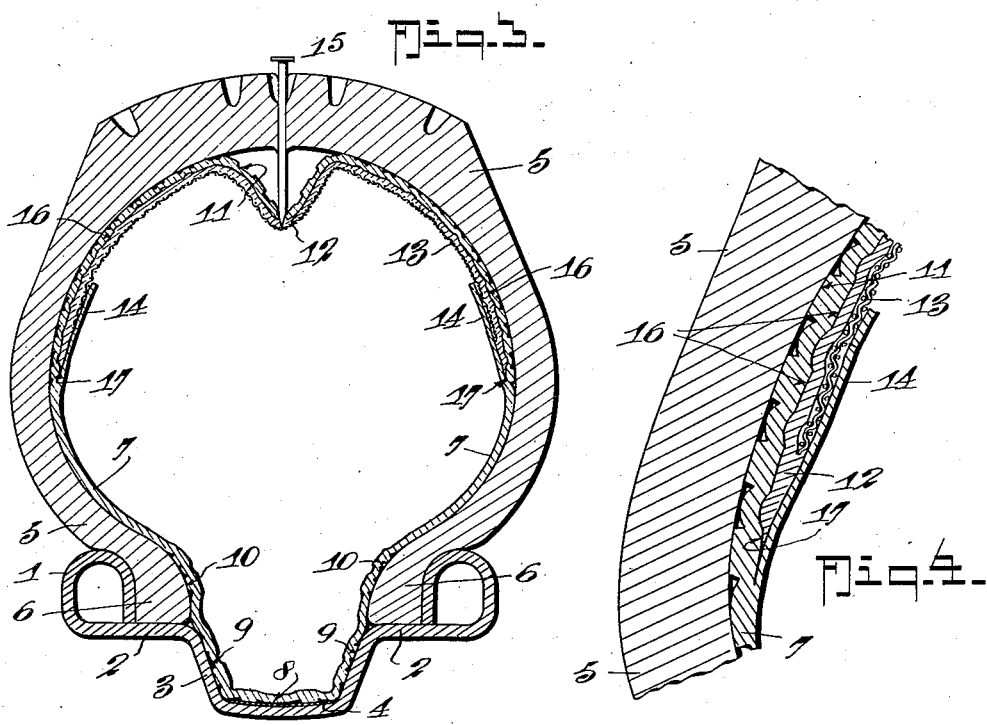
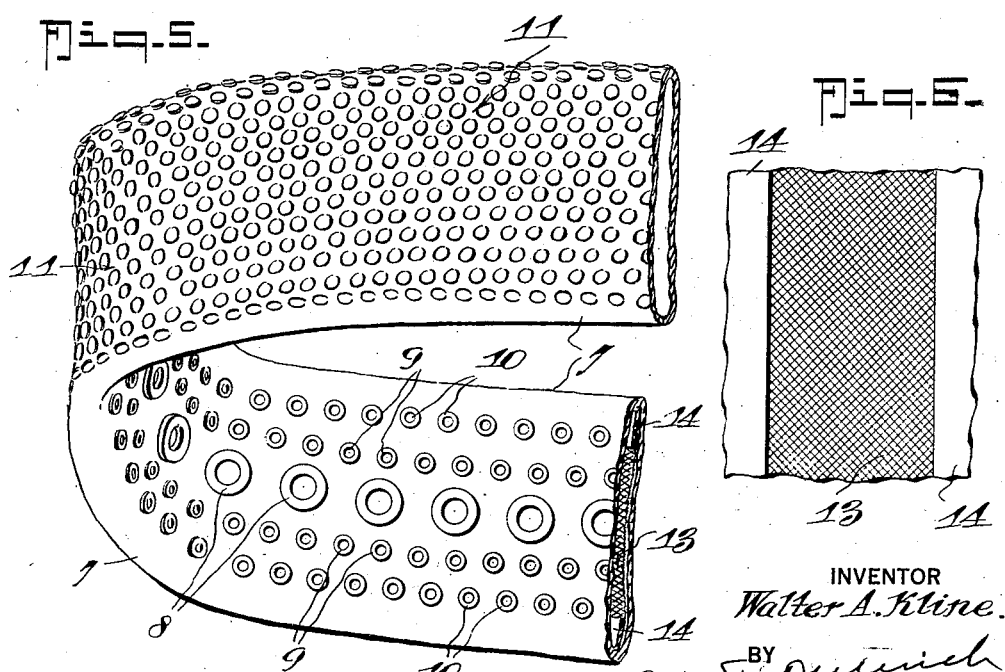
INVENTOR
Walter A. Kline.
BY
ATTORNEY Patented Sept. 2, 1930

1,774,892

UNITED STATES PATENT OFFICE

WALTER A. KLINE, OF AKRON, OHIO, ASSIGNOR TO THE A-R PRODUCTS CORPORATION, OF AKRON, OHIO, A CORPORATION OF OHIO

INNER TUBE FOR PNEUMATIC TIRES

Application filed November 5, 1929. Serial No. 405,028.

My present invention relates to the art of pneumatic tires and it particularly has reference to the inner tubes of such tires.

Recently drop center rims have come largely into use and it has been found that, due to low inflation pressures or when punctures occur, the inner tubes are frequently "chewed up" before the driver becomes aware that he has a flat tire. This is due in large measure to the pinching of the inner tube between the beads of the shoe or between the beads and the rim. When tires on drop center rims become under-inflated they have a decided tendency to creep around the rim and also laterally, thereby frequently injuring the inner tube as well as causing heating of the tire.

My invention, therefore, has for its objects to provide an inner tube which will, after inflation, attach itself to the rim and to the beads of the tire shoe in such a manner as to connect beads to rim by elastic joints which, however, will be of sufficient tenacity to prevent creeping of the shoe on the rim and in the event of sudden deflation will tend to hold the beads of the shoe against the rim flanges and keep them from working into the rim well to the injury of the tube.

Further, the invention has for its object to provide a tube that is puncture-resisting to a high degree and one so constructed that if it be penetrated by a nail or other similar article it will heal the puncture automatically against escape of air.

Further, it is an object to provide an improved tube having sealing provisions and of such construction that nails and other similar articles will not readily penetrate into the inner chamber and damage the tube at points other than the place of original contact between nail and tube as now so frequently happens with the tubes in general use.

Further, the invention seeks to provide an inner tube in which provision is made to place the sealing compound under compression while the tire is in use inflated and to confine such compound on the inner face of the tube by means of a flexible fabric or covering whose side edges are embraced by inner flaps of the tube stock in such manner that the fabric is free to stretch under inflation pressures and put the sealing compound under compression while accommodating itself thereto without stretching the side wall structure of the tube.

Further, it is an object of the invention to provide an inner tube of the self-sealing type in which the sealing compound is located on the inner face of the tube between it and a close meshed tough fabric band which is held in such a manner that it is free to move in all directions within predetermined limits without itself imparting any stretching strains on the rubber walls of the inner tube proper, which fabric also serves to prevent adhesion of the inner surfaces of the tube when deflated and folded for shipment.

Other objects will in part be obvious and in part be pointed out hereinafter.

To the attainment of the aforesaid objects and ends, my invention consists in the novel features of construction and in the combination, connection and arrangement of parts, hereinafter more fully described, and then pointed out in the appended claims.

In the drawings:

Figure 3 is a view similar to Figure 1 showing the action of a puncturing nail on the tube.

Figure 4 is an enlarged detail section showing the formation of the side pocket.

Figure 5 is a detail perspective view of a part of an inner tube with my invention applied.

Figure 6 is a detail elevation of the tube showing the bias arrangement of the fabric.

Figure 1:
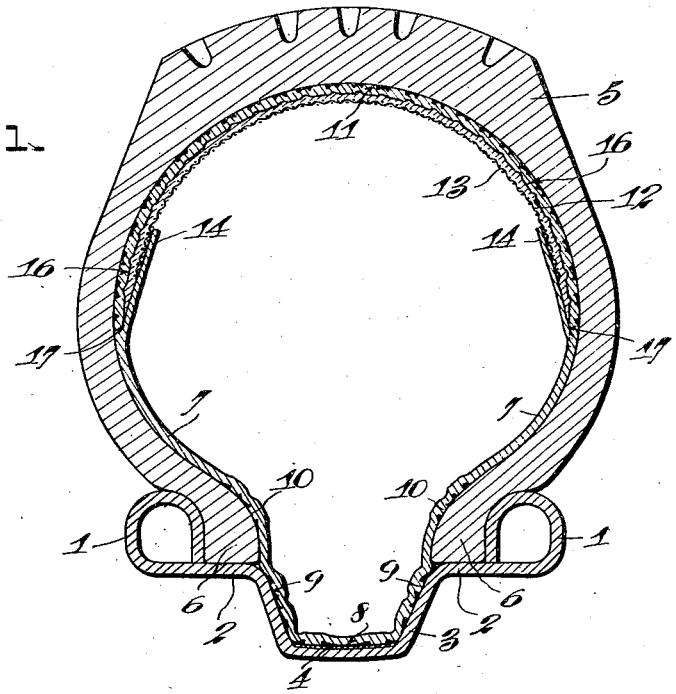
Figure 1 is a cross section of a drop center rim with tire and tube applied and inflated.

In carrying out my invention I provide the tube 7 with, preferably, a button tread face 11 for the dual purposes of providing a non-slipping contact between the tube and the shoe 5 and also to provide additional rubber "spotted" along the outer portion of the tube which, when the tube is inflated in the shoe, will be compressed and form inwardly projecting knobs as at 16 that tend to prevent the plastic sealing composition 12 from creeping and consequently preventing substantial displacement of the fabric strip 13.

It will be noted particularly from Figure 4 of the drawings that the knobs or buttons 11 are spaced apart so as to leave intermediate portions of the tubes to be forced outwardly by the pressure within the tube and thus provide pockets or cuplike portions intermediate the buttons into which the plastic compound projects and which cooperate with the buttons to prevent relative movement between the plastic compound and the wall of the tube with which it lies in contact.

On the inner side the tube 7 has side pockets 17 formed by flaps 14, into which pockets the plastic sealing substance 12 is carried and into which pockets, but not the full depth thereof, the sides of the fabric strip 13 project. The flaps 14 cover the side edges of the fabric strip as shown and are themselves held in contact therewith by the sealing substance 12 which binds the flaps 14 to the peripheral portion of the tube opposite thereto along the edge of the fabric strip.

The tube 7 also has, along its inner periphery, at least one row of suction or vacuum cups 8 to engage the rim strip 4 which is cemented within the bottom of the rim well 3. The strip 4 is provided to cover the spoke ends and any irregularity caused by the attachment of the spokes to the rim. The tube 7 also has a row of suction cups 9 at each side of the central set 8 for the purpose of engaging the side walls of the well 3 of the rim, a third set of vacuum cups 10 being provided to engage the beads 6 of the shoe 5, which beads rest on narrow bead seats 2 of the rim and lie against the flanges thereof.

Figure 2:
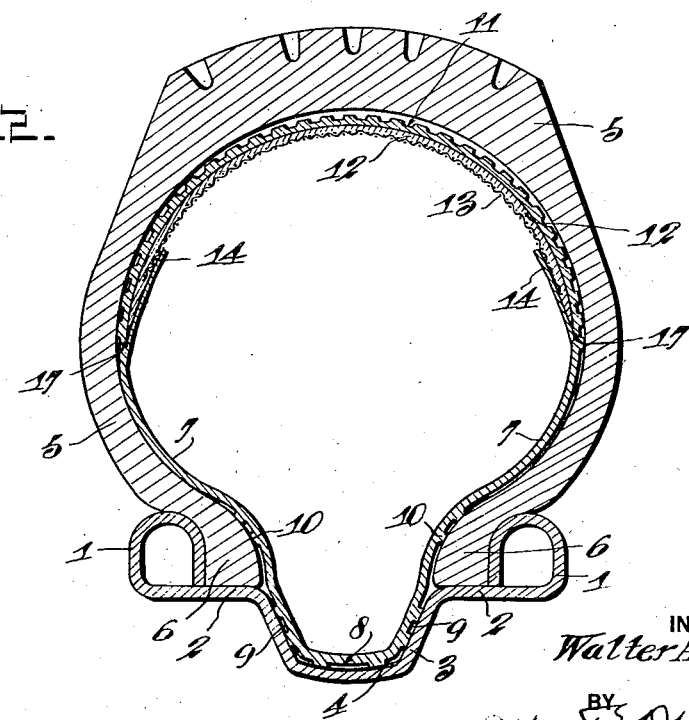
Figure 2 is a view similar to Figure 1 after the tube has been deflated.

As will be noticed by reference to Figures 1 and 2, after the tube has once been inflated and the suction cups 8, 9 and 10 have taken hold, the beads 6 of the shoe will be tied to the rim by flexible elastic connections that will have sufficient tenacity, however, to hold the beads separated laterally (i. e., hold them against the flanges 1) and prevent their working over into the well of the rim. In this way the cutting of the tube by pinching it between the shoe beads or between the beads and the rim which is now so common with ordinary inner tubes, is avoided and the driver will have ample time to draw out of the traffic lane and stop his car before the vacuum cups let go.

By providing the tube with the means for connecting the beads and rim together, shrould a sudden drop in pressure occur within the tube (as might be caused by a blow-out or a large gash cut) such drop in pressure will simply cause the suction cups to hold tighter and thus give the driver ample time to get out of the traffic stream to the side of the road where he can change tires conveniently or repair the damaged one.

Even should the beads of a deflated tire work toward one another somewhat, as might occur if considerable side thrust is placed on the tire, there will be little danger of damaging the rim face of the inner tube since the tube will stretch and accommodate itself to such movement of the beads and when the thrust is relieved will tend to restore the beads to their normal positions on the rim.

Furthermore, it will be obvious that by connecting the beads to the rim through the medium of elastic flexible strips as it were, the likelihood of the shoe creeping around the rim (as it sometimes does with the tubes now generally used) when partially deflated is reduced to a minimum.

It should be understood clearly that the buttons 11 of the tread face of the tube are not vacuum cups and while they tend to prevent creeping between the tube and shoe due to the frictional contact, they will not cause an adhesion of the tread face of the tube to the shoe but leave the tube free to give or be bent inwardly in case a nail 15 is run over (see Figure 3).

Furthermore, by having the fabric strip 13 of close mesh tough stock and leaving it free to "float" with the plastic compound 12 it can accommodate itself to movements of the compound without pulling on the side walls of the tube, and when forced outwardly to compress the sealing compound between the fabric and the tread wall, the side edges of the fabric strip will slip in the pockets 17 the necessary amount without stretching the flaps 14 or the tube walls between the flaps and the rim, thus leaving the tube walls under compression as a means to assist in closing a puncture when the puncturing article is pulled out. The side edges of the inner strip of fabric 13 are yieldably held in place in the pockets by the plastic compound.

The self-sealing compound 12 may be of any well known kind to accomplish its purpose of plugging the holes made after a tube has been punctured. For example, such a compound as is disclosed in the Crombie et al Patent No. 1,498,017 patented June 17, 1924, may be employed.

By providing a tube with means for self-sealing punctures and with means for effecting a more or less tenacious connection between the beads of the shoe and the rim, the life of the shoe and tube will be materially increased. Since the shoe cannot creep on the rim and slippage between tube and rim is positively provided against, heat generated by friction between these elements is practically eliminated.

Attention is called to the fact that the plastic composition 12 is of such nature that it will adhere to the surface of the tube and also to the fabric strip 13.

While I have shown and described in this application means for securing the tire tube and rim against creeping, I make no claim thereto in this application since the subject matter thereof constitutes the subject matter of my divisional application filed July 28, 1930, Serial No. 471,233.

From the foregoing description, taken in connection with the accompanying drawings, it is thought the construction, uses and advantages of my invention will be clear to those skilled in the art to which it relates.

What I claim is:

1. As a new article of manufacture, an inner tube comprising a body of vulcanized rubber enclosing an air chamber, the tread portion of the tube having a pair of annular inside pockets, a layer of adhesive plastic self-sealing compound spread over the inner surface of the tread portion of the tube from pocket to pocket, and an inner strip of fabric covering said plastic compound and having its side edges located within said pockets and yieldably held in place in said pockets by said plastic compound.

2. As a new article of manufacture, an inner tube comprising a body of vulcanized rubber enclosing an air chamber, the tread portion of the tube having a pair of annular inside pockets, a layer of adhesive plastic self-sealing compound spread over the inner surface of the tread portion of the tube from pocket to pocket, and an inner strip of fabric covering said plastic compound and having its side edges located within said pockets, said fabric strip edges being free to float in said pockets.

3. As a new article of manufacture, an inner tube comprising a body of vulcanized rubber enclosing an air chamber, the tread portion of the tube having a pair of annular inside pockets, a layer of adhesive plastic self-healing compound spread over the inner surface of the tread portion of the tube from pocket to pocket, an inner strip of fabric covering said plastic compound and having its side edges located within said pockets, said fabric strip edges being free to "float" in said pockets, said tread portion having its outer tread face from pocket to pocket provided with "buttons" to prevent relative movement between the casing and tube and to leave intermediate areas of the tube to be distorted when the tube is inflated and to provide pockets into which the plastic sealing compound is compressed to prevent relative movement therebetween, substantially as and for the purposes described.

WALTER A. KLINE.